United States Patent
Unnerstall (10) Patent No.: US 10,636,009 B2
(45) Date of Patent: *Apr. 28, 2020

(54) SYSTEM AND METHOD FOR INCREMENTAL OBJECT TRACKING AND PROGRESSIVE REMITTANCE

(71) Applicant: MASTERCARD INTERNATIONAL INCORPORATED, Purchase, NY (US)

(72) Inventor: Rick Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,717

(22) Filed: Apr. 8, 2019

(65) Prior Publication Data

US 2019/0236540 A1 Aug. 1, 2019

Related U.S. Application Data

(63) Continuation of application No. 15/178,495, filed on Jun. 9, 2016, now Pat. No. 10,255,579.

(51) Int. Cl.
*G06Q 10/08* (2012.01)
*G06K 19/077* (2006.01)
*H04L 29/06* (2006.01)
*H04W 12/06* (2009.01)

(52) U.S. Cl.
CPC ... G06Q 10/0833 (2013.01); G06K 19/07758 (2013.01); *H04L 63/0861* (2013.01); *H04W 12/06* (2013.01)

(58) Field of Classification Search
CPC .......... G06Q 10/0835; G06Q 10/0833; G06K 19/07758; H04L 63/0861
See application file for complete search history.

(56) References Cited

U.S. PATENT DOCUMENTS

| | | | |
|---|---|---|---|
| 7,617,146 B2 | 11/2009 | Keaton et al. | |
| 7,819,003 B2 * | 10/2010 | Breed | B60C 11/24 73/290 V |
| 7,895,081 B1 | 2/2011 | Saltzman et al. | |
| 8,473,326 B1 | 6/2013 | Griffith et al. | |
| 9,201,843 B2 * | 12/2015 | Suganuma | G06F 17/00 |
| 10,255,579 B2 | 4/2019 | Unnerstall | |
| 2004/0064405 A1 | 4/2004 | Weichert et al. | |
| 2004/0249652 A1 | 12/2004 | Aldstadt | |
| 2005/0006470 A1 | 1/2005 | Mrozik et al. | |

(Continued)

*Primary Examiner* — Thien M Le
*Assistant Examiner* — Asifa Habib
(74) *Attorney, Agent, or Firm* — Michael Best & Friedrich LLP (57) ABSTRACT

A shipping remittance processor may receive periodic checkpoint data packets during shipping of an object, via a handler, along a shipping route. The shipping remittance processor may then analyze tracking information located in the checkpoint data packet to determine if the tracking information is authentic, and if the object has reached a checkpoint along the shipping route. If the object has reached the checkpoint, the shipping remittance processor may output a remittance indication indicating to output a portion of the total delivery remittance to the handler's remittance account.

20 Claims, 6 Drawing Sheets

(56) References Cited

U.S. PATENT DOCUMENTS

| | | |
|---|---|---|
| 2005/0071244 A1 | 3/2005 | Phillips et al. |
| 2006/0010070 A1 | 1/2006 | Banaugh et al. |
| 2006/0116893 A1* | 6/2006 | Carnes .................. G06Q 10/08 705/333 |
| 2006/0208885 A1 | 9/2006 | Lin |
| 2006/0238334 A1* | 10/2006 | Mangan ................. G06Q 10/08 340/539.13 |
| 2006/0282277 A1 | 12/2006 | Ng |
| 2008/0262646 A1* | 10/2008 | Breed ..................... G01F 23/20 700/226 |
| 2008/0303665 A1 | 12/2008 | Naik et al. |
| 2014/0032034 A1* | 1/2014 | Raptopoulos ........ G08G 5/0069 701/25 |
| 2014/0101069 A1 | 4/2014 | Choi et al. |
| 2014/0149308 A1 | 5/2014 | Ming |
| 2015/0149352 A1* | 5/2015 | Nichols ................. G06Q 10/08 705/40 |
| 2016/0042318 A1 | 2/2016 | Goodman et al. |
| 2016/0350713 A1 | 12/2016 | Nieh et al. |
| 2017/0323260 A1 | 11/2017 | Kim |

\* cited by examiner

SYSTEM AND METHOD FOR INCREMENTAL OBJECT TRACKING AND PROGRESSIVE REMITTANCE

RELATED APPLICATIONS

This application is a continuation of U.S. patent application Ser. No. 15/178,495, filed Jun. 9, 2016, now U.S. Pat. No. 10,255,579, the entire content of which is hereby incorporated by reference.

BACKGROUND

Handlers, or shipping couriers, typically pick up an object for shipping and get paid upon completed shipment of said object. This antiquated system of shipping is burdensome on handlers who are travelling long distances. For example, many handlers must front shipping costs until the shipment is made.

SUMMARY

A shipping remittance processor may receive periodic checkpoint data packets during shipping of an object, via a handler, along a shipping route. The shipping remittance processor may then analyze tracking information located in the checkpoint data packet to determine if the tracking information is authentic, and if the object has reached a checkpoint along the shipping route. If the object has reached the checkpoint, the shipping remittance processor may output a remittance indication indicating that a portion of the total delivery remittance that the handler would otherwise be due for delivering the object to its final destination should be sent to the handler's remittance account. Thus, the handler receives incremental remuneration as he or she reaches checkpoints along the shipping route.

In an aspect, embodiments of a computer-implemented method for incremental object tracking and progressive remittance are described. Embodiments of the method may comprise receiving, at a shipping remittance processor, a checkpoint data packet including tracking information of an object during shipment along a shipment route. Embodiments of the method may also comprise determining, via the shipping remittance processor, that the object has reached a checkpoint along the shipment route, the checkpoint being located between a beginning and end of the shipment route. The method may, upon determining that the object has reached the checkpoint, output a remittance indication indicating that a portion of a total delivery remittance is to be distributed to a handler account.

In another aspect, embodiments of a system for incremental object tracking and progressive remittance are disclosed. Embodiments of the system may comprise a memory storing a checkpoint schedule defining checkpoints for an object traveling along a shipping route. Embodiments of the system may also comprise a shipping remittance processor adapted to execute non-transitory computer readable instructions to: receive a checkpoint data packet including tracking information of the object during shipment along the shipment route, compare the tracking information with the checkpoint schedule to determine if the object has reached one of the checkpoints, and output a remittance indication indicating that a portion of a total delivery remittance is to be distributed to a handler account.

In yet another aspect, embodiments of a handler device for incremental object tracking and progressive remittance are disclosed. Embodiments of the handler device may comprise a memory storing a checkpoint schedule identifying shipping checkpoints along a shipping route for shipping an object. Embodiments of the handler device may also comprise a tracker for determining a real-time geographical location of the handler device. Embodiments of the handler device may also comprise a handler processor in communication with the memory and tracker, the processor configured to analyze the checkpoint schedule and output, via an output device, a prompt to a user to obtain authentication information in response to the real-time geographical location matching one of the checkpoints. Embodiments of the handler device may also comprise an input interface configured to receive the authentication information.

DETAILED DESCRIPTION OF THE EMBODIMENTS

Figure 1:
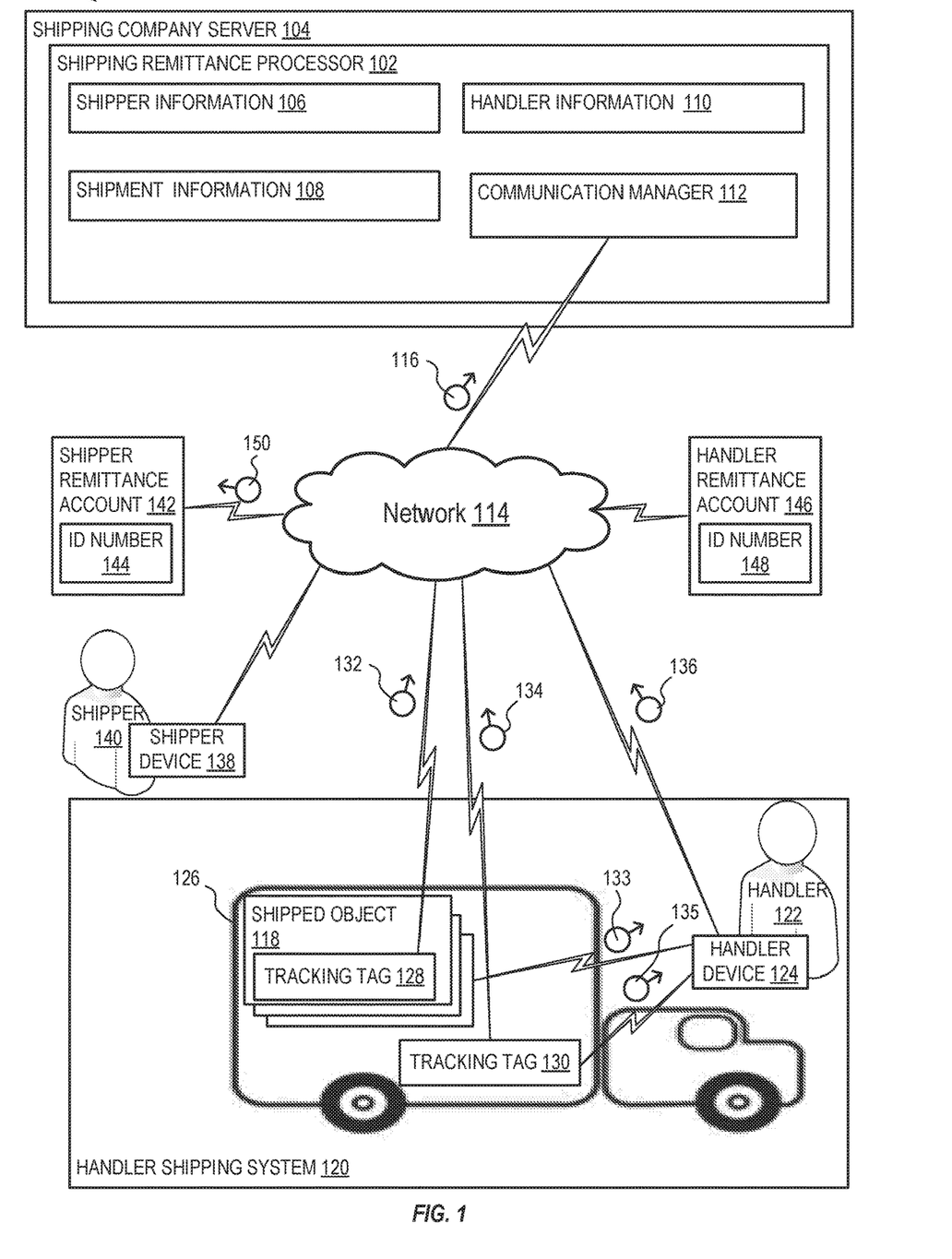
FIG. 1 depicts an exemplary system for incremental object tracking and progressive remittance, in one embodiment.
Figure 2:
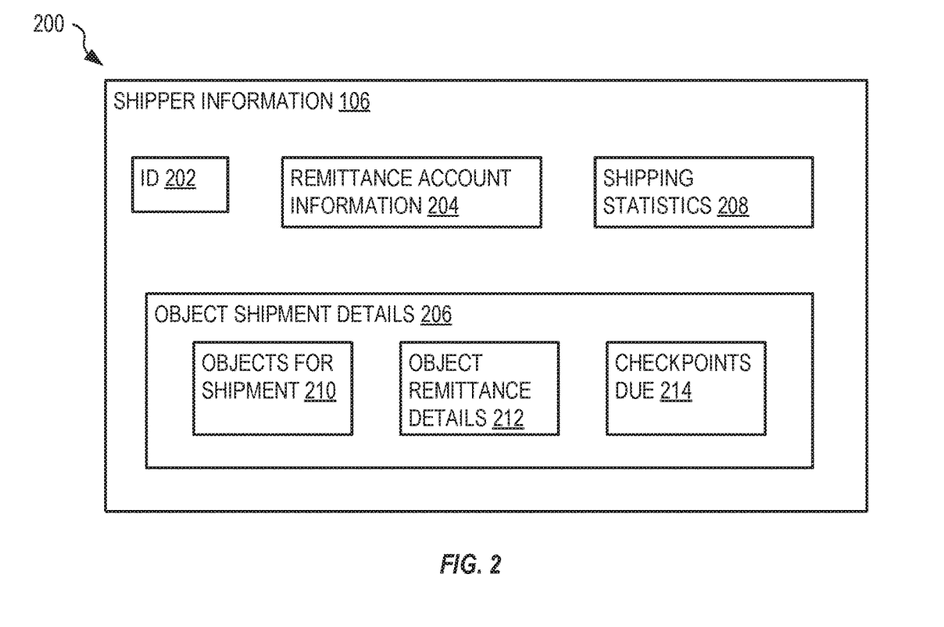
FIG. 2 depicts a block diagram of the shipper information of FIG. 1 in further detail in embodiments.
Figure 3:
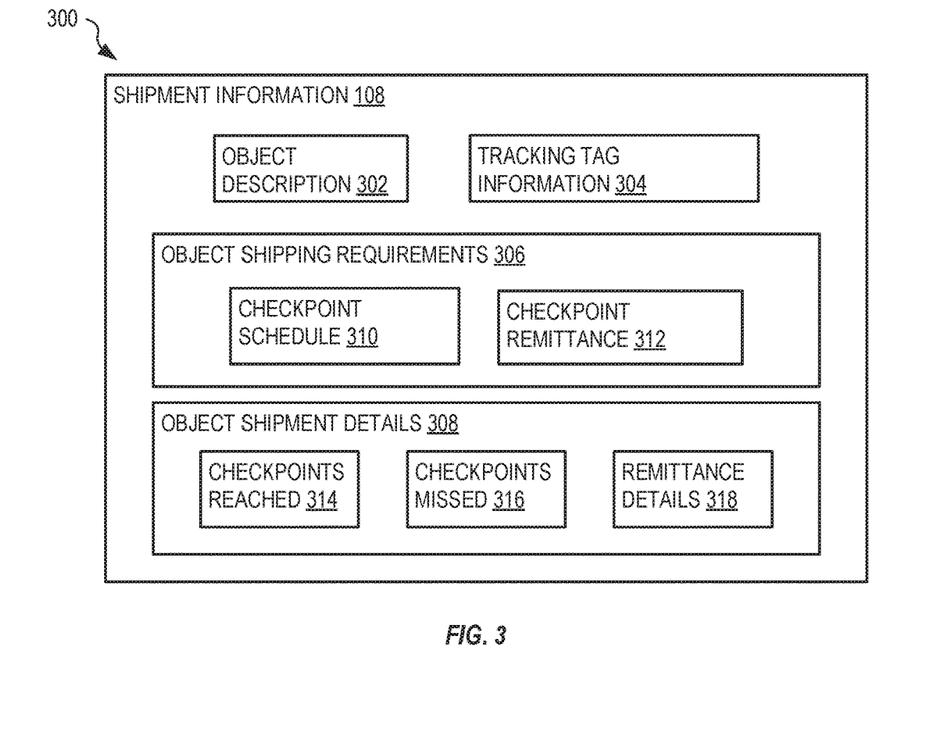
FIG. 3 depicts a block diagram of the shipment information of FIG. 1 in further detail in embodiments.
Figure 4:
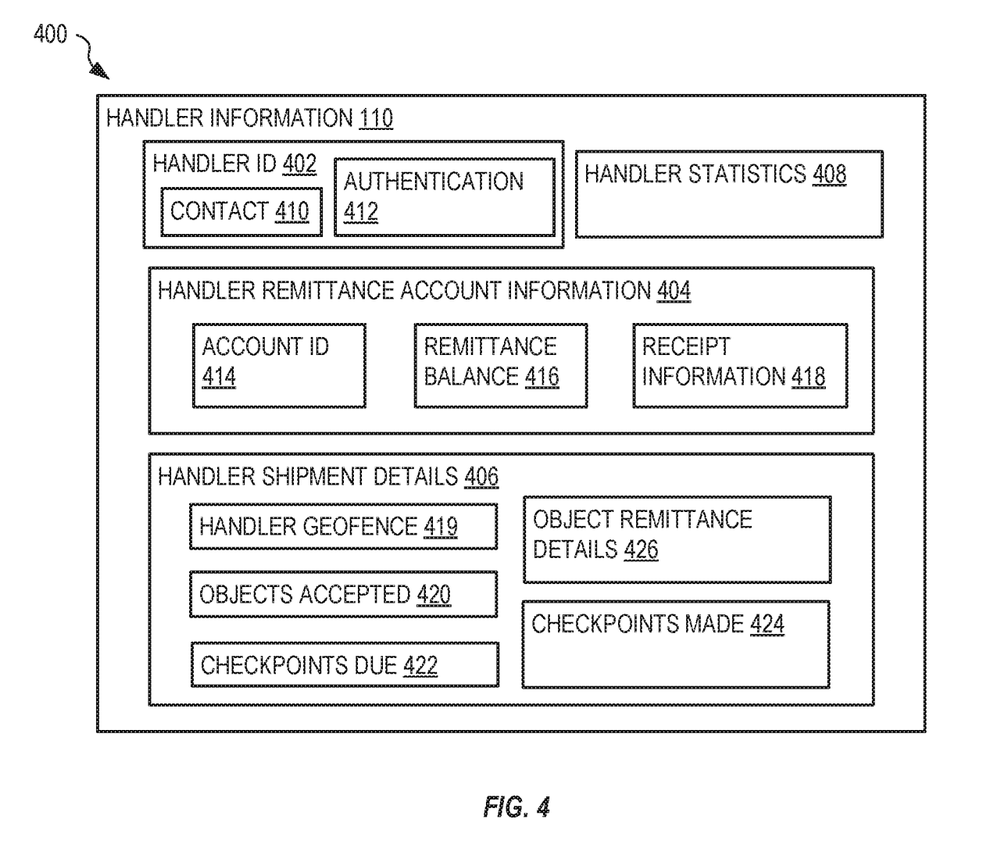
FIG. 4 depicts a block diagram of the handler information of FIG. 1 in further detail in embodiments.
Figure 5:
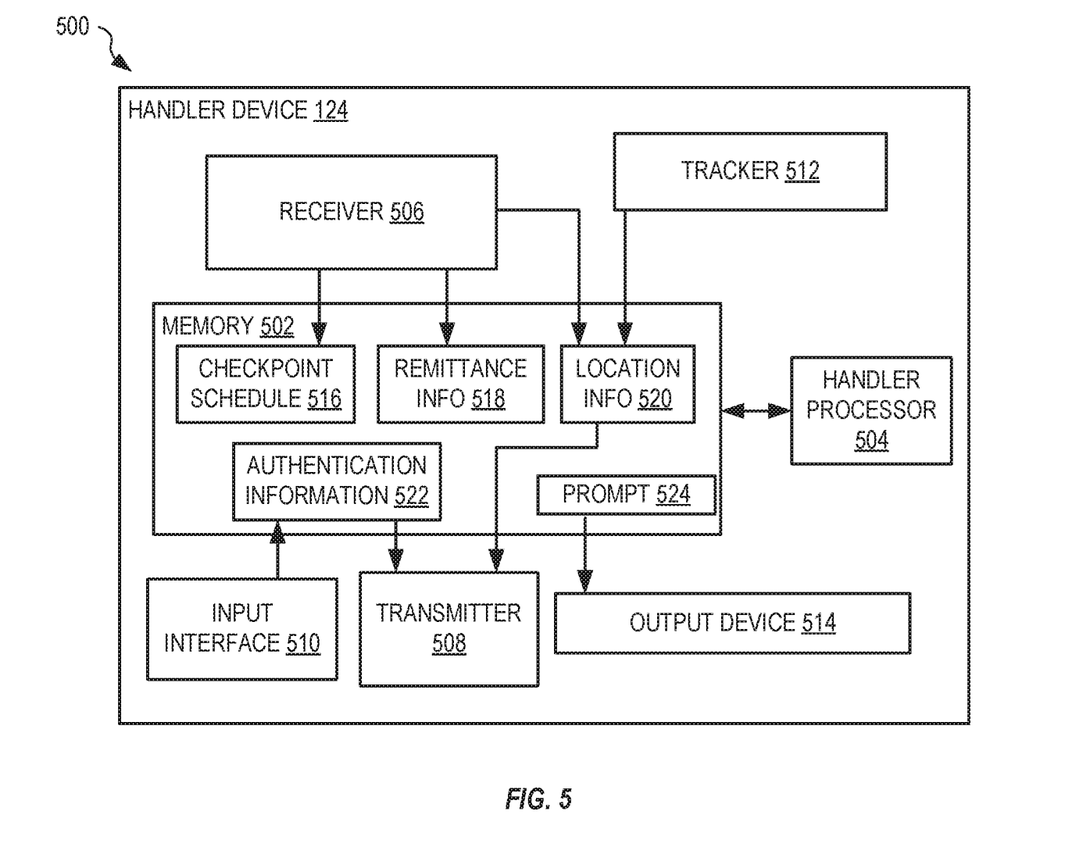
FIG. 5 depicts a block diagram of the handler device of FIG. 1 in further detail in embodiments.

FIG. 1 depicts an exemplary system 100 for incremental object tracking and progressive remittance, in one embodiment. FIG. 2 depicts a block diagram 200 of shipper information 106 in further detail in embodiments. FIG. 3 depicts a block diagram 300 of shipment information 108 in further detail in embodiments. FIG. 4 depicts a block diagram 400 of handler information 110 in further detail in embodiments. FIG. 5 depicts a block diagram 500 of handler device 124 in further detail in embodiments. FIGS. 1-5 are best viewed together with the following description.

In embodiments, system 100 includes shipping remittance processor 102. In embodiments, shipping remittance processor 102 is located within a shipping company server 104. Shipping remittance processor 102 may include one or more computers having one or more memory for storing shipper information 106, shipment information 108, and handler information 110. Shipping remittance processor 102 may include hardware, firmware, software, or any combination thereof adapted to execute the functionality discussed below. In embodiments, shipping company server 104 includes a single computer or multiple computers forming a server network. Shipping remittance processor 102 from a component of any one or more of the computers forming shipping company server 104.

In embodiments, shipping remittance processor 102 may be in communication with a communication manager 112. By being in communication with shipping remittance processor 102, communication manager 112 may be integral to shipping remittance processor 102, or separate therefrom but nonetheless capable of transmitting data thereto. Communication manager 112 may include, but is not limited to, a wired or wireless receiver and a wired or wireless transceiver. Accordingly, shipping remittance processor 102 may be in communication with network 114, for example via communication manager 112. Network 114 may be any one or more of an Internet network, cellular network, WiFi network, or other network type.

Shipping remittance processor 102 may receive a checkpoint data packet 116, via network 114. In embodiments, checkpoint data packet 116 includes tracking information of one or more shipped objects 118 present within handler shipping system 120. Checkpoint data packet 116 may include information constituting one or more of shipper information 106, shipment information 108, or handler information 110. In embodiments, checkpoint data packet 116 includes tracking information of objects 118 obtained during shipment of the object. However, shipping remittance processor 102 may be accessed by shipper 140 and/or handler 122 at any time pre-, during, or post-object shipment to view or modify one or more of shipper information 106, shipment information 108 and handler information 110. In embodiments, handler shipping system 120 includes a handler 122 having an associated handler device 124, and a transportation vehicle 126 capable of transporting the object(s) 118. Handler 122 may operate transportation vehicle 126. Handler device 124 may be one or more of a mobile device, smartphone, tablet, personal computer, or other device. Handler device 124 includes hardware capable of connecting wirelessly to network 114, such as a cellular module, WiFi module, or other wireless communications module. Shipped objects 118 may include one or more of: freight, transported vehicles, passengers on a passenger vehicle, or any other item being transported.

Checkpoint data packet 116 may be a wireless transmission that includes tracking information from one or more of: first tracking tag 128 associated with object 118, second tracking tag 130 mounted on transportation vehicle 126, or handler device 124. Checkpoint data packet 116 may be transmitted to shipping remittance processor 102 at one or more checkpoints along the shipping route.

In embodiments, first tracking tag 128 is located on each individual object 118. In additional embodiments, first tracking tag 128 is associated with a group of objects 118, such as on a freight pallet. In yet additional embodiments, first tracking tag 128 is a device, such as a mobile device, smartphone, tablet, or personal computer of a passenger that is travelling via transportation vehicle 126. In embodiments, first tracking tag 128 includes a wireless transmission component capable of transmitting tracking information 132 of object 118 (or group of objects) to network 114, which is then relayed to shipping remittance processor 102 as all or a portion of checkpoint data packet 116. In embodiments, first tracking tag 128 includes a wireless transmission component capable of transmitting tracking information 133 of object 118 (or group of objects) to handler device 124, which in turn transmits tracking information 133 of objects 118 to network 114, which in turn transmits said tracking information 133 to shipping remittance processor 102 as all or a portion of checkpoint data packet 116.

In embodiments where first tracking tag 128 transmits directly to network 114, the data may automatically transmit without intervention by handler device 124, thereby potentially providing more consistent and reliable transmission times. In embodiments utilizing handler device 124 to relay tracking information 133, as opposed to directly transmitting tracking information 132 to network 114, power consumption by first tracking tag 128 is significantly reduced. In such embodiments, the transmission protocol for transmitting tracking information 133 may be low energy, such as Bluetooth, or even zero power such as an optical or physical scan of first tracking tag 128 by handler device 124. Automatic transmission of the data from first tracking tag 128 to handler device 124 may be accomplished via first tracking tag 128 automatically transmitting tracking information 133 to handler device 124, or via handler device 124 pinging first tracking tag 128, when a checkpoint is reached.

In embodiments, second tracking tag 130 is located on transportation vehicle 126. In embodiments, second tracking tag 130 includes a wireless transmission component capable of transmitting tracking information 134 of transportation vehicle 126 to network 114, which is then relayed to shipping remittance processor 102 as all or a portion of checkpoint data packet 116. In embodiments, second tracking tag 130 includes a wireless transmission component capable of transmitting tracking information 135 of transportation vehicle 126 to handler device 124, which in turn transmits tracking information 135 transportation vehicle 126 to network 114, which in turn transmits said tracking information 135 to shipping remittance processor 102 as all or a portion of checkpoint data packet 116.

In embodiments where second tracking tag 130 transmits directly to network 114, the data may automatically transmit without intervention by handler device 124, thereby potentially providing more consistent and reliable transmission times. In embodiments utilizing handler device 124 to relay tracking information 135, as opposed to directly transmitting tracking information 134 to network 114, power consumption by second tracking tag 130 is significantly reduced. In such embodiments, the transmission protocol for transmitting tracking information 135 may be low energy, such as Bluetooth, or even zero power such as an optical or physical scan of second tracking tag 130 by handler device 124. Automatic transmission of the data from second tracking tag 130 to handler device 124 may be accomplished via second tracking tag 130 automatically transmitting tracking information 135 to handler device 124, or via handler device 124 pinging second tracking tag 130, when a checkpoint is reached.

The wireless transmission component of each of first tracking tag 128 and second tracking tag 130 may respectively be one or more of a Bluetooth device, WiFi device, cellular connectivity device, RFID tag or QR code that is scanned by handler device 124, or other wireless transmission system for transmitting tracking information to network 114 and/or handler device 124.

In embodiments, handler device 124 transmits tracking information 136 of handler 122 to network 114, which in turn transmits said tracking information 136 to shipping remittance processor 102. As discussed above, in embodiments, handler device 124 may serve as a relay device for transmitting one or more of tracking information 133 of object 118 or tracking information 135 of transportation vehicle 126. In such embodiments, tracking information 136 may include one or more of: handler tracking information 136, object tracking information 133, and/or transportation vehicle tracking information 135.

Thus, it should be understood that checkpoint data packet 116 may include any one or more of: object tracking information 132 received by network 114 from first tracking tag 128, object tracking information 133 relayed to network 114 from first tracking tag 128 via handler device 124, transportation vehicle tracking information 134 received by network 114 from second tracking tag 130, transportation vehicle tracking information 135 relayed to network 114 from second tracking tag 130 via handler device 124, and handler tracking information 136 received by network 114 from handler device 124.

Shipping remittance processor 102 may further be in communication, via network 114, with one or more of: a shipper device 138 associated with a shipper 140 (who, e.g., requests that the handler 122 deliver one or more of objects 118), a shipper remittance account 142 having an associated shipper remittance account identification (ID) number 144, and a handler remittance account 146 having an associated handler remittance account ID number 148. Shipper 140 may desire to ship one or more of objects 118, and may access shipping remittance processor 102 via interaction with shipper device 138 to configure shipment details as discussed in further detail below. Shipper device 138 may be one or more of a mobile device, smartphone, tablet, personal computer, or other device in communication with network 114.

Upon receipt of checkpoint data packet 116, shipping remittance processor 102 may analyze one or more of shipper information 106, shipment information 108 and handler information 110 to determine whether a remittance indication 150 is to be output to shipper remittance account 142. Accordingly, in embodiments, multiple remittance indications 150 may be output as object 118 travels along the shipping route. When remittance indication 150 is output, a remittance is transferred from shipper remittance account 142 to handler remittance account 146. In embodiments, shipper remittance account 142 may be a financial institution, such as a creditor, bank, etc. In other embodiments, shipper remittance account 142 is a balance held by the shipping company managing one or more of shipping company server 104 or shipping remittance processor 102, and such balance is preloaded by shipper 140 with a desired balance upon configuration of shipper information 106. In embodiments, handler remittance account 146 may be a financial institution, such as bank, creditor, etc. In embodiments, handler remittance account 146 may be a prepaid resource in which upon receiving remittance indication 150, shipper remittance account 142 loads an additional remittance value onto the prepaid card.

As shown in FIG. 2, shipper information 106 includes details about shipper 140. Shipper information 106 may be stored within transitory or non-transitory memory associated with shipping remittance processor 102 and/or shipping company server 104 such that it is accessible via shipping remittance processor 102 and/or network 114. Shipper 140 may access shipping remittance processor 102 via interaction with shipper device 138 and network 114, to configure shipper information 106. In embodiments, shipper information 106 includes one or more of shipper identification 202, shipper remittance account information 204, object shipment details 206, and shipping statistics 208. Shipper identification 202 may include identifying information of shipper 140 such as the shipper's name, address, contact information, etc.

Shipper remittance account information 204 may include information of shipper remittance account 142 such as shipper remittance account ID number 144, routing information, institution name, etc.

Object shipping details 206 may include information about an object (e.g. one or more of objects 188) for shipment. For example, object shipping details 206 may identify the objects for shipment 210, the object remittance details 212, and the checkpoints due 214. Object remittance details 212 may include the total remittance which is to be paid for each object 118 identified within objects for shipment 210, as well as a remittance value per object checkpoint as indicated within the checkpoints due 214 information. Checkpoints due 214 may include details regarding the checkpoints that the handler 122 must meet during a shipping route in order to receive the object remittance prescribed by object remittance details 212. In certain embodiments, checkpoints due 214 indicates an amount of objects 118, of the total objects, that are to be dropped off at the checkpoint. For example, if handler 122 is shipping a batch of objects 118 and certain of those are to be dropped off at each or some of the checkpoints, checkpoints due 214 may indicate not only those specific checkpoints that must be made, but also which objects 118 need to be left at the checkpoint.

In certain embodiments, the object shipping details 206 may define aspects of the handler 122. For example, where the handler 122 is a travelling salesperson, shipper 140 may be an employer of handler 122. In such a situation, object shipping details 206 may provide details of handler 122 such that as handler 122 travels along a sales trip route (aka shipping route), the handler 122 is given per diem payment for food and lodging, or other expenses.

Shipping statistics 208 may include information about previous shipments made by shipper 140, including remittance information, shipper reviews, percent of successful remittances, etc.

In embodiments, the object 118 and shipper 140 may be the same. In other words, the shipper 140 may be travelling via transportation vehicle 126. In such embodiments, the object shipment details 206 may include ticket information such that object remittance details 212 identifies an amount for such travel based upon each stop along the travel route.

As shown in FIG. 3, shipment information 108 may include information specific to objects 118 that are being shipped. Shipment information 108 may be stored within transitory or non-transitory memory associated with shipping remittance processor 102 and/or shipping company server 104 such that it is accessible via shipping remittance processor 102 and/or network 114. In embodiments, shipment information 108 may include one or more of: object description 302, tracking tag information 304, object shipping requirements 306, and object shipment details 308.

Object description 302 may define object characteristics such as the type of object, weight of object, size of object, etc.

Tracking tag information 304 may define a tracking tag associated with the object being shipped. In embodiments, tracking tag information 304 is defined via handler 122 interacting with handler device 124 to communicate with shipping remittance processor 102 via network 114 and identify identification information of one or more of handler device 124, first tracking tag 128 and second tracking tag 130 as tracking tag information 304. In embodiments, tracking tag information 304 is defined via shipper 140 interacting with shipper device 138 to communicate with shipping remittance processor 102 via network 114 and identify identification information of first tracking tag 128 associated with object 118. During setup and configuration of tracking tag information 304, handler 122 need not specifically be the courier that is transporting objects 118, but may be another entity or person assisting in the preparation of object 118 for shipment.

Object shipping requirements 306 may identify information required during shipment of the object. In embodiments, object shipping requirements includes one or more of checkpoint schedule 310 and checkpoint remittance 312. Checkpoint schedule 310 may be similar to checkpoints due 214 as discussed above with respect to FIG. 2. Checkpoint remittance 312 may include information similar to object remittance details 212 discussed above with respect to FIG. 2.

Object shipment details 308 may include information included in checkpoint data packet 116 that is received by shipping remittance processor 102 during shipment of object 118. In embodiments, object shipping details 308 includes information about one or more of: the checkpoints reached 314 by the shipped object during shipment, the checkpoints missed 316 by the shipped object during shipment, and the remittance details 318 associated with the object during shipment.

Checkpoints reached 314 may include a list of each checkpoint, as indicated within checkpoint schedule 310 and/or checkpoints due 214, that has been reached by object 118 along shipping route. For example, shipping remittance processor 102 may compare one or more of tracking information 132, 133, 134, 135, 136 discussed above, with one or more of checkpoint schedule 310 and/or checkpoints due 214, to determine if object 118 has reached the appropriate checkpoint. If the object has reached the appropriate checkpoint, such status may be indicated within checkpoints reached 314.

Checkpoints missed 316 may include a list of each checkpoint, as indicated within checkpoint schedule 310 and/or checkpoints due 214, that has been missed by object 118 along shipping route. For example, shipping remittance processor 102 may compare one or more of tracking information 132, 133, 134, 135, 136 discussed above, with one or more of checkpoint schedule 310 and/or checkpoints due 214, to determine if object 118 did not reached the appropriate checkpoint. If the object did not reach the appropriate checkpoint, such status may be indicated within checkpoints missed 316.

Remittance details 318 may identify what remittances have been made to the handler remittance account 146 based upon checkpoints reached 314. For example, when the object 118 reaches a checkpoint, as discussed in further detail below, the shipping remittance processor 102 may output a remittance indication 150 (see FIG. 1) indicating for the shipper remittance account 142 to release remittance to handler remittance account 146. Upon output of said remittance indication 150, shipping remittance processor 102 may indicate a record thereof in remittance details 318. Accordingly, in embodiments, multiple remittance indications 150 may be output as object 118 travels along the shipping route.

As shown in FIG. 4, in embodiments, handler information 110 may include information via handler 122. Handler information 110 may be stored within transitory or non-transitory memory associated with shipping remittance processor 102 and/or shipping company server 104 such that it is accessible via shipping remittance processor 102 and/or network 114. In embodiments, handler information 110 may include one or more of: handler ID information 402, handler remittance account information 404, handler shipment details 406, and handler statistics 408.

Handler ID information 402 may include identification information of handler 122. In embodiments, handler ID information includes one or more of: handler contact information 410 and handler authentication information 412. Handler contact information 410 may include address, phone number, etc. Handler authentication information 412 may include one or more of a template indicating a fingerprint scan, retinal scan, or facial scan of handler 122, and an authentication token associated with handler device 124 such as a SIM card ID.

Handler remittance account information 404 may include information regarding the remittance account 146 of handler 122. In embodiments, handler remittance account information 404 includes one or more of remittance account ID 414, remittance balance 416, and receipt information 418. Remittance account ID 414 may include routing information, institution name, etc. of the handler remittance account 146. Remittance balance 416 may include the balance paid to handler remittance account 146. Remittance receipt information 418 may include transaction details regarding remittance account 146.

Handler shipment details 406 includes details regarding various shipments performed, to be performed, or being performed by handler 122. In embodiments, handler shipment details 406 includes one or more of: handler geofence 419, objects accepted for shipment 420, checkpoints due 422, checkpoints made 424, and object remittance details 426. Handler geofence 419 may define a boundary that handler 122 is capable of shipping within. For example, handler geofence 419 may identify that handler 122 is only allowed, or willing, to ship objects within a certain state, county, city, etc. Accordingly, handler 122 is only presented objects 118 that meet these requirements. Objects accepted for shipment 420 may include one or more of: past objects accepted and already shipped by handler 122, objects currently being shipped by handler 122, and objects accepted by handler 122 to be shipped at a future date. Checkpoints due 422 may include a list of each checkpoint that handler 122 is to meet during each object identified in objects accepted 420, including objects currently being shipped and objects being shipped in the future by handler 122. Checkpoints made 424 may include a list of each checkpoint that handler 122 has already met including each object currently being shipped and past objects shipped as identified in objects accepted 420.

FIG. 5 depicts a block diagram 500 of handler device 124 of FIG. 1, in embodiments. Handler device 124 may include one or more of: memory 502 in communication with handler processor 504, receiver 506, transmitter 508, an input interface 510, a tracker 512, and an output device 514.

Memory 502 may include transitory or non-transitory memory configured to store one or more of: a checkpoint schedule 516, remittance information 518, location information 520, authentication information 522, and a prompt 524.

In embodiments, checkpoint schedule 516 indicates each checkpoint that the handler 122 must meet while shipping a given object (e.g. object 118) along a shipping route. Checkpoint schedule 516 may be transmitted to handler device 124 from shipping remittance processor 102 via network 114 such that checkpoint schedule 516 is received by handler device 124 via receiver 506.

In embodiments, remittance information 518 includes information regarding remittance indication output by shipping remittance processor 102. Remittance information 518 may include verification that remittance has been made from shipper remittance account 142 to handler remittance account 146. Remittance information 518 may be transmitted by shipping remittance processor 102 as a remittance packet via network 114 such that the remittance packet is received by handler device 124, via receiver 506.

In embodiments, location information 520 includes tracking location information about one or more of handler device 124, objects 118, and transportation vehicle 126. For example, tracker 512 may monitor the location of handler device 124 and store the location within location information. In embodiments, receiver 506 receives one or more of tracking information 133 of objects 118 (FIG. 1) and tracking information 135 of transportation vehicle 135 (FIG. 1), and the tracking information is then stored as location information 520. Location information 520 may then be transmitted, via transmitter 508, to shipping remittance processor 102 via network 114, for example, within checkpoint data packet 116. In embodiments, transmitter 508 may not always have connectivity to network 114. In such embodiments, location information 520 may be stored within memory 502 until transmitter 508 obtains connectivity to network 114 at which time transmitter 508 transmits tracking information 136, including location information 520 to network 114.

In embodiments authentication information 522 is utilized to authenticate handler device 124. For example, authentication information 522 may include a token indicating verification of handler device 124. Such token may be an electronic token specific to the handler device 124 such as a SIM card identifier, or another encryption key. In such embodiments, interface 510 may receive such electronic token via interaction with handler 122 or automatically via accessing the electronic token stored within memory 502. In embodiments, authentication information 522 may include biometric information of handler 122 using handler device 124. For example, handler 122 may interact with input interface 510 to provide one or more of a biometric scan including: fingerprint scan of the handler 122, retinal scan of the handler 122, facial scan of the handler 122 or other type of biometric scan. Authentication information 522 may then be transmitted, via transmitter 508 to shipping remittance processor 102, for example, within checkpoint data packet 116. Authentication information 522 may then authenticate location information 520 also sent within checkpoint data packet 116.

In embodiments, prompt 524 may be used to notify handler 122 of an upcoming, or arrived at, checkpoint. For example, prompt 524 may be generated by handler processor 504 and output via output device 514 such that handler 122 knows to acquire location information 520. In certain embodiments, handler 122 may acquire location information 520 automatically based upon tracker 512, and/or an automatic reception, via receiver 506, of one or more of tracking information 133 from object 118 and tracking information 135 from transportation vehicle 126.

Handler processor 504 may be a microprocessor, or other discrete digital circuitry, adapted to execute functionality of one or more of memory 502, receiver 506, transmitter 508, input interface 510, tracker 512, and output device 514.

Receiver 506 may be a wireless receiver capable of communicating with network 114. Transmitter may be a wireless transmitter capable of communication with network 114. Receiver 506 and transmitter 508 may be independent from one another or may be combined such as a transceiver.

Input interface 510 may be a device for interfacing with handler 122. In embodiments, input interface 510 is a biometric scanner capable of scanning one or more of: a fingerprint of the handler 122, a retinal scan of the handler 122, a facial scan of the handler 122, and another type of biometric scan of the handler 122.

Tracker 512 may be one or more of a GPS tracker, a WiFi enabled tracker, or a cellular module capable of tracking location via cellular connectivity.

Output device 514 may be one or more of a visual, audio, or tactile output. For example, output device 514 may be a display of handler device 124. In embodiments, output device 514 is an audio speaker of handler device 124. In embodiments, output device 514 is a vibration system of handler device 124.

Figure 6:
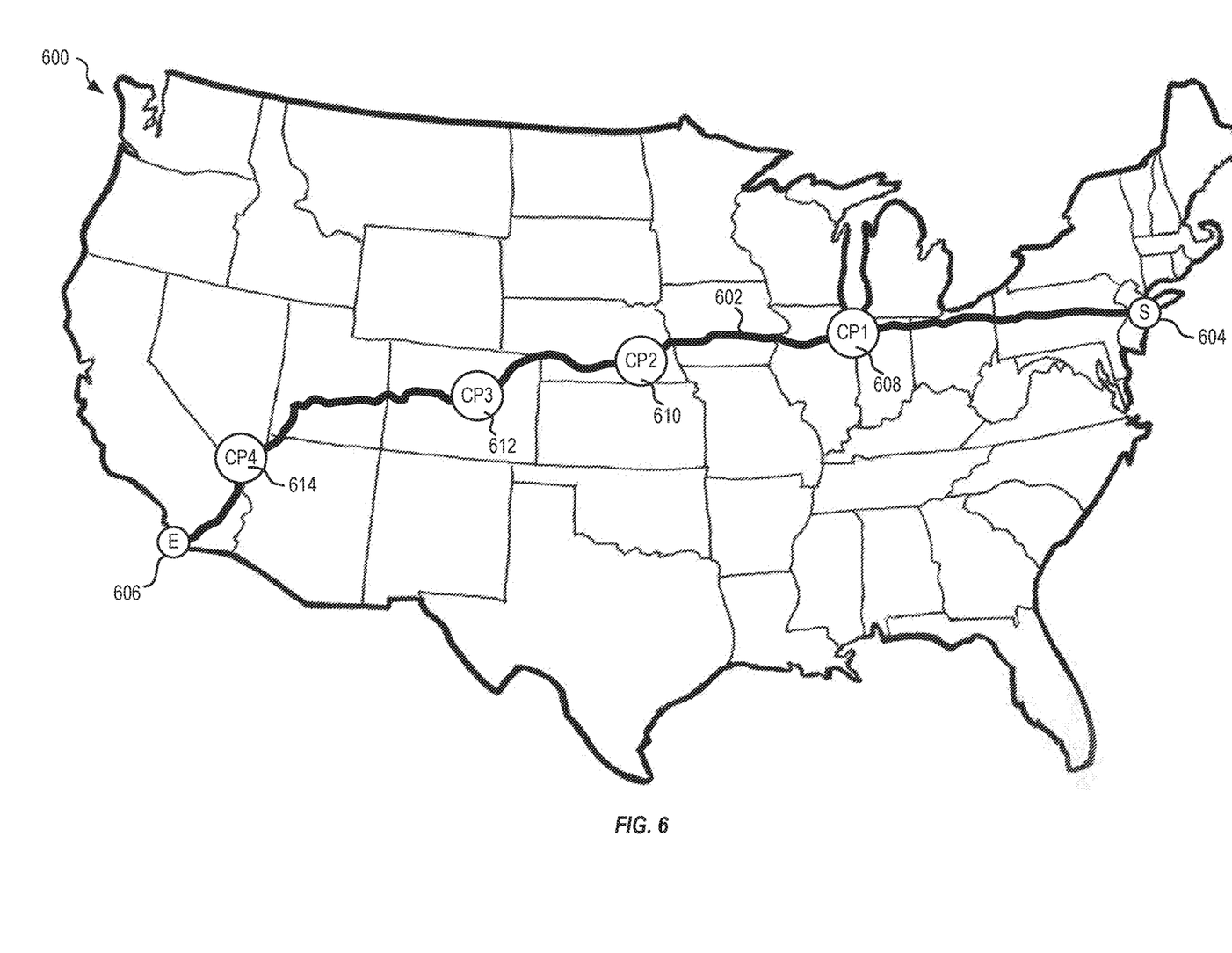
FIG. 6 depicts an exemplary map showing a shipping route having a start, end, and a first checkpoint, second checkpoint, third checkpoint, and fourth checkpoint, in an embodiment.

FIG. 6 depicts an exemplary map 600 showing shipping route 602 having a start 604, end, 606 and a first checkpoint 608, second checkpoint 610, third checkpoint 612, and fourth checkpoint 614, in an embodiment. As shown, an object (e.g. object 118) is scheduled for shipment along shipping route 602 with a start 604 in Stamford, Conn. In embodiments, to schedule the shipment, a shipper (e.g. shipper 140) utilizes a shipper device (e.g. shipper device 138) to configure one or both of shipment information (e.g. shipment information 108) and shipper information (e.g. shipper information 106). During such configuration, the shipper may determine the start and end of the shipping route, as well as the number and locations of each checkpoint along the route. Such information may be stored within a shipping remittance processor, such as object shipment details 206 (FIG. 2) and/or object shipping requirements 306 (FIG. 3).

After configuration by the shipper, a handler may accept said objects for shipment, and begin shipping such objects. In one example of embodiments, handler 122 may accept an object 118, and begin travelling along shipping route 602 from start 604 to first checkpoint 608. Upon arrival at first checkpoint 608, a first checkpoint data packet may be sent to the shipping remittance processor. In the example of FIG. 6, first checkpoint 608 is Chicago, Ill. For example, a first instance of checkpoint data packet 116 may be sent to shipping remittance processor 102. Depending on the requirements determined by either shipping remittance processor 102 or shipper 140, first checkpoint data packet may include one or more of: location information received directly from a tag associated with the shipped object (e.g. tracking information 132 in FIG. 1), location information from a tag associated with the shipped object that is relayed via a handler device (e.g. tracking information 133 in FIG. 1), location information received directly from a transportation vehicle carrying the shipped object (e.g. tracking information 134 in FIG. 1), location information from a transportation vehicle carrying the shipped object that is relayed via a handler device (e.g. tracking information 135 in FIG. 1), and location information associated with a handler device (e.g. tracking information 136 in FIG. 1).

Upon receipt of the first checkpoint data packet, the shipping remittance processor may determine if the tracking location received matches a determined checkpoint, and if so, output a remittance indication to the shipper remittance account. At which time, a portion of the total delivery remittance for the entire shipment from start 604 to end 606 may be allocated to handler remittance account 146.

Should a network connection be unavailable upon arrival at first checkpoint 608, tracking information from one or more of the object, transportation vehicle, or handler device, may be stored respectively until connection can be made. Upon which time, the shipping remittance processor may output the determined remittance indication. By way of example, in the embodiment illustrated in FIG. 6, output remittance indication 150 may indicate to release funds of $200 from the shipper remittance account to the handler remittance account when both the transportation vehicle and handler device tracking information is verified by shipping remittance processor 102.

This process then repeats for second checkpoint 610, shown as Lincoln, Nebr., and third checkpoint 612, shown as Denver, Colo., and fourth checkpoint 614, shown as Las Vegas, Nev. Upon arrival at end 608 of shipping route 602, a final checkpoint data packet is sent to the shipping remittance processor and a final remittance indication indicating to transmit the remaining portion of the total delivery remittance balance is output to shipper handler account. In the example shown in FIG. 6, a remittance indication is output from the shipping remittance processor for a final remittance of $1,700 to be transferred from the shipper remittance account to the handler remittance account.

Figure 7:
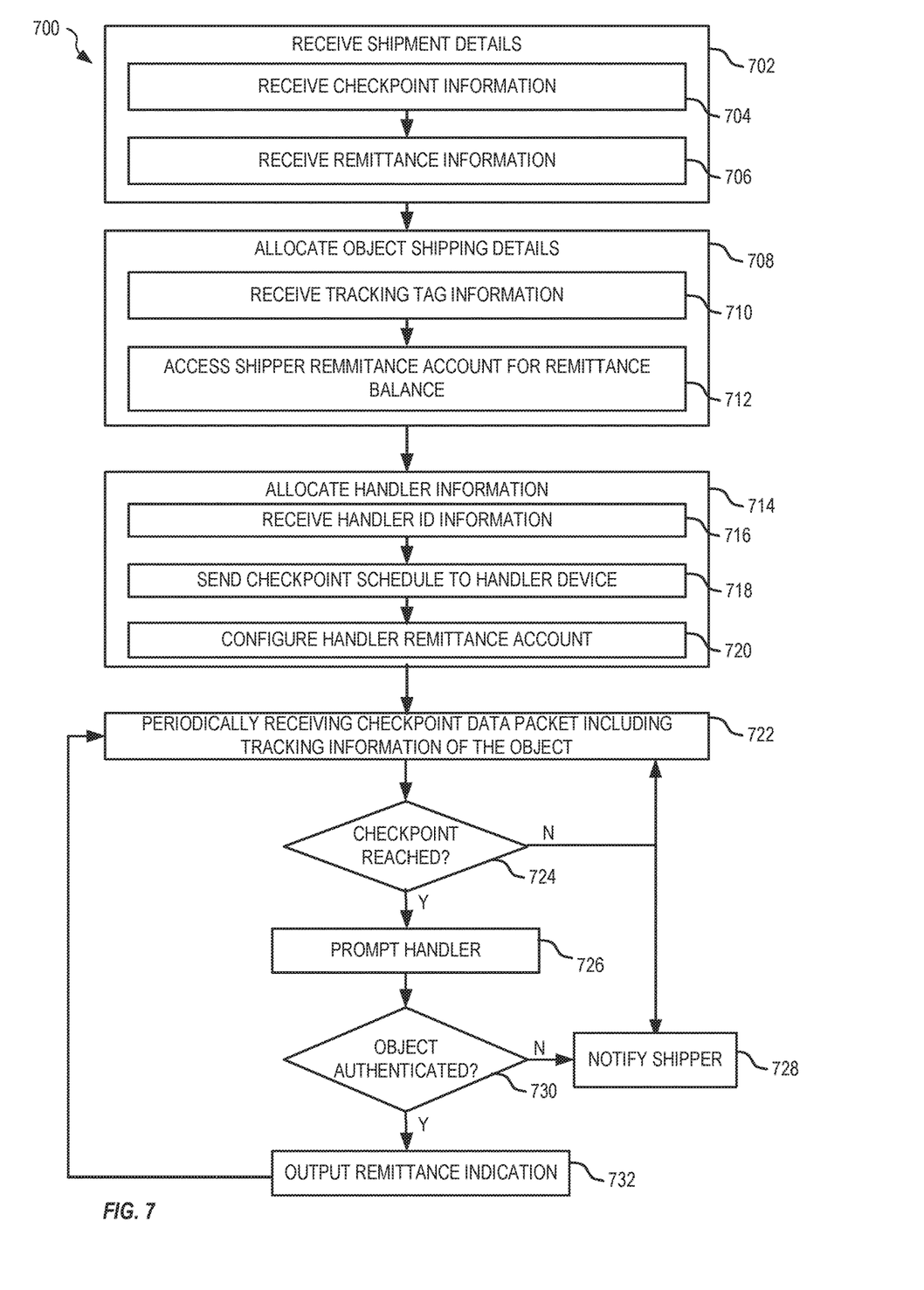
FIG. 7 depicts an exemplary method for incremental object tracking and progressive remittance, in embodiments.

FIG. 7 depicts an exemplary method 700 for incremental object tracking and progressive remittance, in embodiments. Method 700 is for example implemented within one or more aspects of system 100, of FIG. 1.

In embodiments, method 700 includes operation 702. In operation 702, method 700 may receive shipment details for shipping an object. In one example of operation 702, shipping remittance processor 102 receives one or more of shipper information 106 and shipment information 108.

In embodiments, operation 702 includes sub-operation 704 in which method 700 receives checkpoint information. In one example of sub-operation 704, shipping remittance processor 102 receives, from shipper 140, desired checkpoints at which object 118 should travel along during shipment, and such checkpoints are stored in one or more of object shipment details 206 and object shipping requirements 306.

In embodiments, operation 702 includes sub-operation 706 in which method 700 receives remittance information. In one example of sub-operation 706, shipping remittance processor 102 receives, from shipper 140, object remittance details 212 and/or checkpoint remittance 312 indicating the portion of the total delivery remittance that is allocated for each checkpoint reached during shipment of object 118.

In embodiments, method 700 includes operation 708. In operation 708, method 700 may allocate shipping details with objects being shipped. In one example of operation 706, shipping remittance processor 102 may configure shipment information 108.

In embodiments, operation 708 includes sub-operation 710 in which method 700 receives tracking tag information. In one example of sub-operation 710, shipping remittance processor 102 receives, from shipper 140 or handler 122, tracking tag information of one or more of first tracking tag 128, second tracking tag 130, and handler device 124, and stores such tracking tag information in shipment information 108 as tracking tag information 304.

In embodiments, operation 708 includes sub-operation 712 in which method 700 verifies remittance balance information. In one example of sub-operation 712, shipping remittance processor 102 accesses, via network 114, shipper remittance account 142 to verify available remittance to cover the entire remittance from start to end along the configured shipping route.

In embodiments, method 700 includes operation 714. In operation 714, method 700 allocates handler information within shipping remittance processor. In one example of operation 714, shipping remittance processor 102 allocates handler information 110 within its associated memory.

In embodiments, operation 714 includes sub-operation 716 in which method 700 receives handler ID information. In one example of sub-operation 716, shipping remittance processor 102 receives, via network 114, handler ID information 402. In embodiments, the handler ID information 402 may include authentication information 412 received via handler 122 interacting with handler device 124.

In embodiments, operation 714 includes sub-operation 718 in which method 700 sends a checkpoint schedule to the handler device. In one example of sub-operation 718, shipping remittance processor 102 transmits, via network 114, checkpoint schedule 310 to handler device 124.

In embodiments, operation 714 includes sub-operation 720 in which method 700 configures handler remittance account. In one example of sub-operation 720, shipping remittance processor 102 configures handler remittance account information 404, for example via interaction with handler 122 via network 114 and handler device 124.

In embodiments, method 700 includes operation 722. In operation 722 method 700 receives, periodically, checkpoint data packet including tracking information of the shipped object. In one example of operation 722, shipping remittance processor 102 receives checkpoint data packet 116. Checkpoint data packet 116 may be sent according to any the following protocols: periodically regardless of where the object 118 is located, only when the object 118 reaches a checkpoint, and when first tracking tag 128, second tracking tag 130 and handler device 124 are able to connect to network 114.

In embodiments, method 700 includes decision 724. In decision 724, method 700 determines if the object has reached a checkpoint. In one example of decision 724, shipping remittance processor 102 analyzes the information received in checkpoint data packet 116 to against checkpoint schedule 310 determine if object 118 has reached a checkpoint. Shipping remittance processor 102 may analyze a timestamp of the tracking information to determine if the checkpoint has been reached in a given time threshold. In another example of decision 724, handler device 124, via tracker 512, compares checkpoint schedule 516 to determine if the handler 122 has reached a given checkpoint as listed in checkpoint schedule 516 stored in memory 502 of handler device 124. If a checkpoint has been reached, method 700 proceeds to operation 726, decision 730, or operation 732. If a checkpoint has not been reached, method performs either operation 728 or repeats operation 722.

In embodiments, method 700 includes operation 726. In operation 726 the handler is prompted that a checkpoint has been reached. In one example of operation 726, handler device 124 generates prompt 524. In response to the prompt 524, handler 122 may retrieve one or more tracking information 133 from object 118 and tracking information 135 from transportation vehicle 126 for relay to shipping remittance processor 102 via network 114.

In embodiments, method 700 includes operation 728. In operation 728, method 700 notifies the shipper of a missed checkpoint. In one example of operation 728 shipping remittance processor 102 notifies shipper 140 when object 118 misses a checkpoint. In embodiments, shipping remittance processor 102 may update checkpoints missed 316 during operation 728. Upon completion of operation 728, method 700 may repeat operation 722.

In embodiments, method 700 includes decision 730. In decision 730, method 700 may authenticate the tracking information of an object. In one example of decision 730, shipping remittance processor 102 compares authentication information 522, received in a checkpoint data packet 116 from handler device 124, against authentication information 412. If method 700 determines that the tracking information is authentic, method 700 may proceed to operation 732. Otherwise, method 700 may proceed to operation 728 and notify the shipper that the received tracking information is unauthentic.

In embodiments, method 700 includes operation 732. In operation 732, method 700 outputs a remittance indication indicating to release a portion of the total delivery remittance to a handler remittance account. In one example of operation 732, shipping remittance processor 102 outputs remittance indication 150 to shipper remittance account 142 indicating to release a portion of the total delivery remittance for shipping object 118 along the shipping route. Upon completion of operation 732, method 700 may repeat operation 722 until all checkpoints have been reached.

The systems and methods described above may be used for a variety of implementations. For example, the object may be a traveling salesman, at which each checkpoint is a stop along the salesman's trip. At each checkpoint, the salesman may use his device to indicate he has reached a given checkpoint. In response, the shipping remittance processor may then release an output indicating to pay the salesman his per diem and lodging remittance.

As another example, the objects may be transported vehicles. At each checkpoint, a tracking tag located on each vehicle being transported, and in embodiments another tracking tag located on the trailer in which the transported vehicles are located, may connect with shipping remittance processor, via a network, to verify that the transported vehicle is at a given checkpoint. In response, the handler (e.g. a courier transporting the transported vehicles) may receive a portion of the total delivery remittance for the overall transportation of the vehicle.

As another example, the objects may be freight within a tractor trailer. At each checkpoint, a tracking tag located on a pallet holding the objects, and in embodiments another tracking tag on the tractor trailer, may connect with shipping remittance processor, via a network, to verify that the freight is at a given checkpoint. In response, the handler (e.g. a courier transporting the transported vehicles) may receive a portion of the total delivery remittance for the overall transportation of the freight such as gas remittance to reach the next checkpoint.

As yet another example, the objects may be passengers on a passenger vehicle operated by a handler. At each checkpoint, a tracking tag associated with the passenger, such as the passenger's smartphone, may transmit a checkpoint data packet to the shipping remittance processor. The shipping remittance processor may identify when a passenger exits the passenger vehicle based upon the last checkpoint received. At which time, the shipping remittance processor may output a remittance indication indicating to transfer remittance from the passenger's remittance account to the handler's remittance account.

It should also be appreciated that there may be more than one handler in possession of the object during the totality of the shipping route. In such a case, the handler may modify one or both of the object shipping details 308 and object shipping requirements 306 to specify a given handler for each checkpoint. The authentication data within each checkpoint data packet 116 may then be used to verify that the object is with the appropriate handler for a given segment of the shipping route.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer-implemented method for incremental object tracking and progressive remittance, comprising:
   receiving, at a shipping remittance processor, a checkpoint data packet including tracking information of an object during shipment along a shipment route;
   determining, via the shipping remittance processor, that the object has reached a checkpoint along the shipment route, the checkpoint being located between a beginning and end of the shipment route, the shipment route including multiple checkpoints for a single handler; and
   upon determining that the object has reached the checkpoint, outputting a remittance indication indicating that a portion of a total delivery remittance for delivery on the shipping route is to be distributed to a handler account of the single handler.

2. The method of claim 1, the tracking information being relayed by a handler device from a tracking tag located on the object or a shipping vehicle.

3. The method of claim 2, the tracking information including data sent via a wireless transmission received by the handler device from the tracking tag located on the object or the shipping vehicle.

4. The method of claim 3, the wireless transmission being one or more of: an RFID scan of the tracking tag by the handler device, and a Bluetooth transmission from the tracking tag to the handler device.

5. The method of claim 1, the receiving comprising receiving, via a network, the checkpoint data packet as a first communication from a tracking tag located on the object.

6. The method of claim 5, the receiving further comprising receiving the checkpoint data packet additionally as a second communication from a handler device.

7. The method of claim 1, the determining including comparing a timestamp of the tracking information within the checkpoint data packet against checkpoint requirements stored in the shipping remittance processor.

8. The method of claim 1, the outputting the remittance indication including sending the remittance indication to a shipper remittance account.

9. The method of claim 1, said outputting the remittance indication including sending the remittance indication to a prepaid resource.

10. The method of claim 1, further comprising authenticating the tracking information.

11. The method of claim 10, the authenticating comprising:
   receiving, at the shipping remittance processor, an authentication token generated by a handler device.

12. The method of claim 1, wherein the checkpoint data packet includes location information determined from a tracker system, within a handler device, identifying a real-time geographical location of the handler device.

13. The method of claim 1, the object being a passenger in a passenger vehicle, the checkpoint data packet being received via a transmission from a mobile device of the passenger.

14. A system for incremental object tracking and progressive remittance, comprising:
   a memory storing a checkpoint schedule defining checkpoints for an object traveling along a shipping route; and
   a shipping remittance processor adapted to execute non-transitory computer readable instructions to:
      receive a checkpoint data packet including tracking information of the object during shipment along the shipping route, the shipping route including multiple checkpoints for a single handler,
      compare the tracking information with the checkpoint schedule to determine if the object has reached one of the checkpoints, and
      output a remittance indication indicating that a portion of a total delivery remittance, for shipment of the object along the shipping route, is to be distributed to a handler remittance account.

15. The system of claim 14, further comprising a communication manager in communication with the shipping remittance processor for receiving the checkpoint data packet via a wireless transmission.

16. A handler device for incremental object tracking and progressive remittance, comprising:
- a memory storing a checkpoint schedule identifying shipping checkpoints along a shipping route for shipping an object, the shipping route including multiple checkpoints for a single handler;
- a tracker for determining a real-time geographical location of the handler device;
- a handler processor in communication with the memory and tracker, the handler processor configured to analyze the checkpoint schedule and output, via an output device, a prompt to a user to obtain authentication information in response to the real-time geographical location matching one of the multiple checkpoints for the single handler;
- an input interface configured to receive the authentication information.

17. The handler device of claim 16, further comprising a transmitter for transmitting a checkpoint data packet including the authentication information to a shipping remittance processor.

18. The handler device of claim 16, the input interface including a wireless scanner for receiving location information of an object via one or more of a RFID scan of a tracking tag located on the object, and a Bluetooth transmission from the tracking tag located on the object.

19. The handler device of claim 16, the input interface including a biometric scanner; the authentication information including one or more of: a handler fingerprint scan, a handler retinal scan, and a handler facial scan received via the biometric scanner.

20. The handler device of claim 16, further comprising a receiver for receiving a remittance data packet indicating remittance has been placed in a handler remittance account.

* * * * *